INVENTOR.
KENNETH W. PARSONS
BY
Harry O. Ernsberger
ATTORNEY

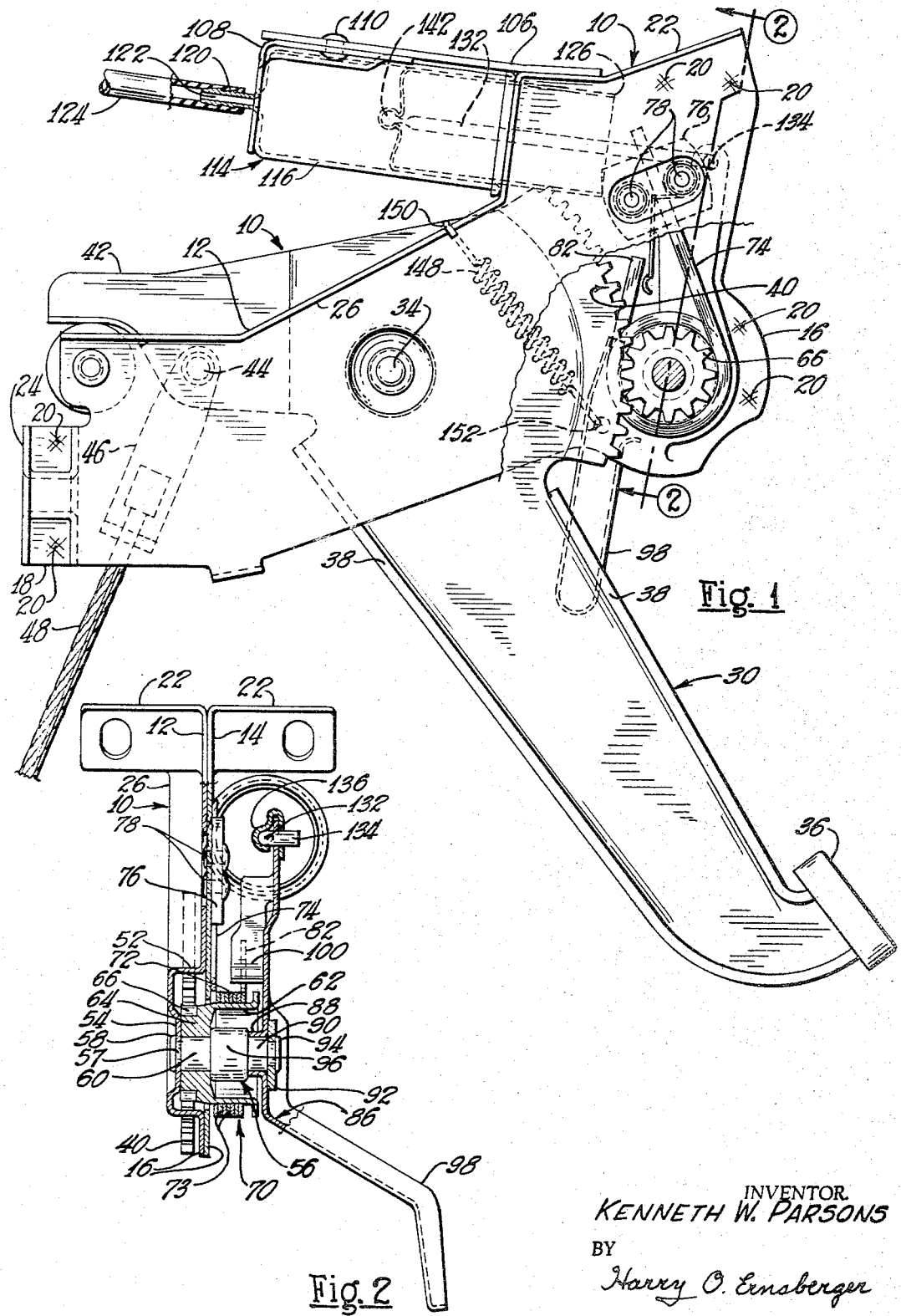

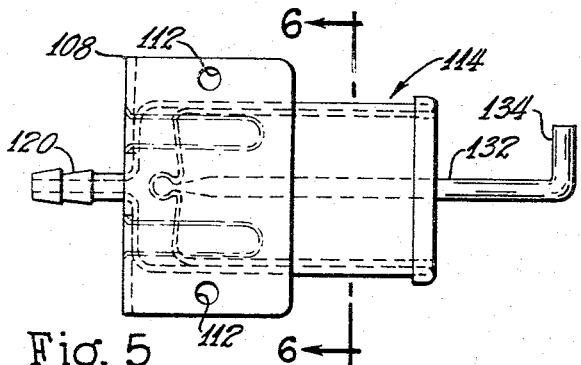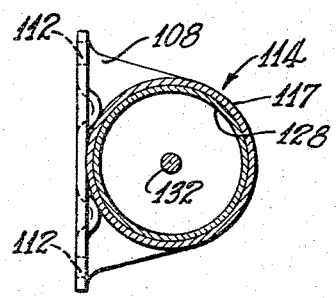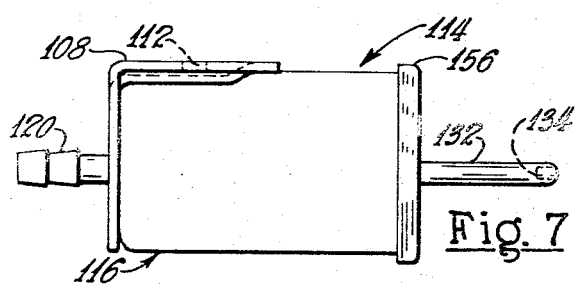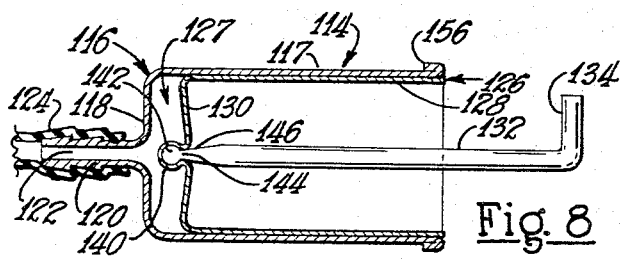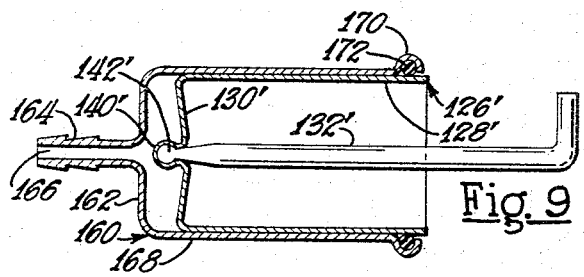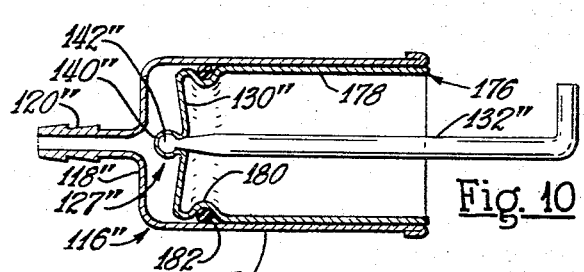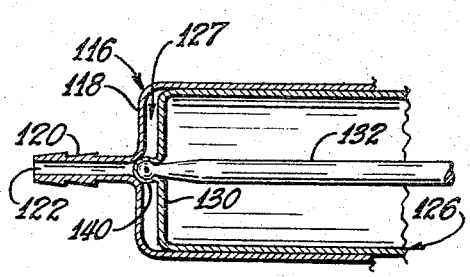

3,333,512
FLUID PRESSURE ACTUATED SERVO-MOTOR
Kenneth W. Parsons, Toledo, Ohio, assignor to Universal American Corporation, New York, N.Y., a corporation of Delaware
Filed July 28, 1965, Ser. No. 475,393
3 Claims. (Cl. 92—140)

This invention relates to servo-motors and more particularly to a fluid pressure actuated mechanism especially adaptable for operation under comparatively low fluid pressure, the servo-motor being particularly suitable for controlling the release mechanism of a vehicle parking brake construction.

The parking or emergency brakes of a vehicle are usually actuated or operated by manual means or foot-operated lever constructions in association with retaining mechanism for holding the brakes in set position. While manually operated or foot-operated release means for a parking brake actuator have been conventionally used, fluid-actuated servo-motors of the diaphragm type have come into extensive use for releasing the parking brake mechanism wherein the vacuum or reduced pressure existent in a mixture intake manifold of an internal combustion engine is utilized to actuate or flex a diaphragm connected with release means.

In the latter arrangement a control valve in the vacuum line or tube connected with the diaphragm-actuated servo-motor preferably interconnected with the vehicle transmission control mechanism is operated to effect a release of the parking brake mechanism when the gear selector of the transmission is moved from neutral to an operative position. The diaphragm in a servo-motor of this character is subjected to substantial flexure and distortion engendering fracture and resulting in failure of the servo-motor unit.

The present invention embraces a servo-motor unit of the fluid actuated type wherein two cup-like members are arranged in telescoped relation with contiguous cylindrical surface areas in close relation with a highly viscous mobile material disposed between the contiguous surfaces providing a sealing means of a character which will withstand comparatively low differential pressures without fracture, the members being supported for relative movement for actuating mechanism to be controlled thereby.

An object of the invention resides in a servo-motor construction wherein two nested cup-like members provided with contiguous cylindrical surfaces dimensioned so as to be snugly yet slidably disposed in telescopic relation with a highly viscous material or medium between the contiguous surfaces of a character which adheres tenaciously to the surfaces to an extent as to be resistant to fluid pressure for effecting relative movement between the members without destroying the seal provided by the viscous material.

Another object of the invention is the provision of a fluid actuated servo-motor comprising two cup-like members in telescoped relation with a viscous material between contiguous surfaces of the members forming a seal between the members wherein the end construction of the inner member is fashioned with a hollow ball-like shape serving as a connecting means for connection with mechanism to be actuated, the ball-like shape serving as a valve means for interrupting communication of fluid pressure between the members when the ball-like shape is engaged with an end region of the second member at its tubular connection with a source of differential fluid pressure.

Another object of the invention resides in the provision of a fluid pressure actuated servo-motor comprising two telescopingly-arranged cylindrically-shaped cup members snugly fitted for slidable contact with a viscous material having adhesive characteristics between the relatively slidable surfaces providing an effective pressure resistant seal whereby the servo-motor may be inexpensively constructed and is capable of long life as there are no distortable components to become worn or impaired during operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a foot-operated mechanism for actuating the parking brakes of a vehicle embodying a servo-motor of the invention for actuating or controlling the release mechanism for the brake actuating construction;

FIGURE 2 is a detail sectional view taken substantially on the line 2—2 of FIGURE 1;

FIGURE 5 is a top plan view of the servo-motor unit shown in FIGURE 1;

FIGURE 6 is a transverse sectional view taken substantially on the line 6—6 of FIGURE 5;

FIGURE 7 is a side elevational view of the construction shown in FIGURE 5;

FIGURE 8 is a longitudinal sectional view of the construction shown in FIGURE 7;

FIGURE 9 is a view similar to FIGURE 8 illustrating a modified form of construction;

FIGURE 10 is a view similar to FIGURE 9 showing another form of modification of the construction, and FIGURE 11 is a fragmentary sectional view similar to FIGURE 8 showing the components in fluid pressure interrupting position.

Figure 3:
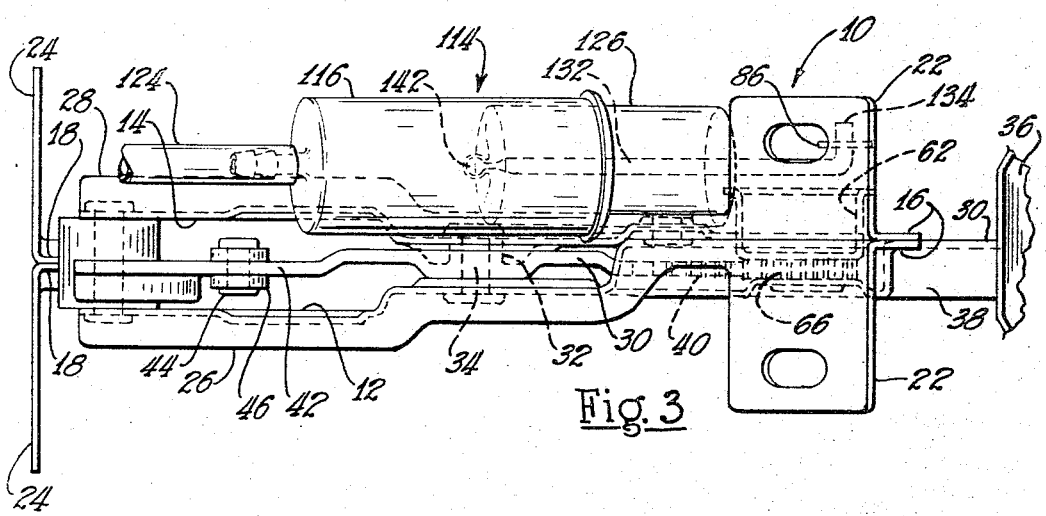
FIGURE 3 is a top plan view of the construction illustrated in FIGURE 1.

While the servo-motor construction of the invention is illustrated in combination with a foot-operated parking brake actuating mechanism of an automotive vehicle and utilized for controlling the release means thereof, it is to be understood that the servo-motor construction may be employed for actuating or controlling other mechanisms wherever the same may be found to have utility.

Referring to the drawings in detail and initially to the construction illustrated in FIGURES 1 through 4, there is shown a foot-operated parking brake actuator adapted to be disposed in the conventional manner in the operator's compartment of an automotive vehicle, the parking brakes being actuated by movement of a foot-operated member. The arrangement illustrated in FIGURES 1 through 4 includes a support means 10 comprising mating members 12 and 14 having pairs of flange portions 16 and 18 which are joined together by spot welding 20 or by other suitable means.

The forward portions of the members 12 and 14 are provided with pad portions 22 which are adapted to be secured to the instrument panel (not shown) of the vehicle. The opposite end regions of the members 12 and 14 are fashioned with laterally extending flanges 24 adapted to be bolted, riveted or otherwise secured to the firewall or dashboard (not shown) of the vehicle. The mating sections 12 and 14 comprising the support means are respectively provided with reinforcing flanges 26 and 28 to provide strength and rigidity for the support means.

The parking brake actuating mechanism includes a brake actuator, lever or member 30 preferably formed of sheet metal and having a hub portion 32 accommodating a rivet or stub shaft 34 extending through the hub portion 32 and registering openings in the members 12 and 14, the rivet or stub shaft 34 forming a pivotal axis or fulcrum for the foot-operated lever 30. In the form illustrated in the drawings, the actuator 30 is a foot-operated lever provided at its lower end with a foot pad portion 36. It is to be understod that a power unit may be provided for operating the actuator 30, if desired.

In the embodiment illustrated, the lever 30 is of one piece construction comprising a depending portion fashioned with reinforcing flanges 38, an integral central body portion fashioned with an arcuately shaped toothed or rack portion 40 and an integral forwardly projected portion 42. A pin or rivet 44 extends through an opening in the projecting portion 42 and registering openings in the furcations of a clevis 46. A flexible cable 48 is anchored to the clevis 46 by an anchor member 50, the cable 48 being connected with the parking brakes (not shown) of the vehicle.

As particularly shown in FIGURE 2, the support section 12 is fashioned with a laterally extending or raised hollow portion 52 and a central region of the raised portion recessed as at 54, the recessed or depressed portion 54 supporting a shaft 56, a tenon portion 57 of the shaft extending through an opening in the recessed portion 54 and the end of the tenon swaged as at 58 to securely fasten the shaft 56 to the recessed portion 54.

A portion 60 of the shaft 56 journally supports a drum 62, a hub portion 64 of the drum construction being fashioned with integral teeth providing a pinion portion 66, the teeth of which are in mesh with the arcuately shaped rack portion 40 carried by the lever construction 30.

A lever retaining or locking means 70 is associated with the drum 62 and is frictionally engageable with the exterior surface of the drum for retaining or holding the lever construction 30 and parking brake mechanism connected therewith in brake setting position. The locking means 70 is inclusive of a coil spring portion 72 provided by a plurality of close convolutions 73 as shown in FIGURE 2, the strip of material providing the means 70 being of hardened spring steel or similar material. The strip material forming the retaining means 70 is comparatively thin in relation to its width as shown in FIGURE 2.

The convolutions 73 of the spring portion 72 are flat and are wound in close relation as shown. The interior diameter of the coil spring portion 72 of the retaining means 70 is of a dimension to normally snugly fit onto the exterior cylindrical surface of the drum 62, the edges of the convolutions of the coil spring portion engaging the drum being preferably rounded. The convolutions or coils 73 of the spring portion 72 are wound and prestressed in hardening whereby they normally frictionally grip the exterior surface of the drum 62 to hold the parking brakes in set position.

The means 70 is fashioned with a projecting terminal portion 74 which is anchored to the support section 14 by an anchor member 76 secured to the portion 14 by rivets 78. The convolutions or coils 73 of the spring portion 72 are coiled in a direction whereby rotation of the drum 62 during brake setting movement of the lever or actuator 30 tends to unwind the convolutions or coils in a counterclockwise direction as viewed in FIGURES 1 and 4 thus facilitating setting of the parking brakes with a minimum of friction drag or retarding force between the drum 62 and the coil spring portion 72.

Figure 4:
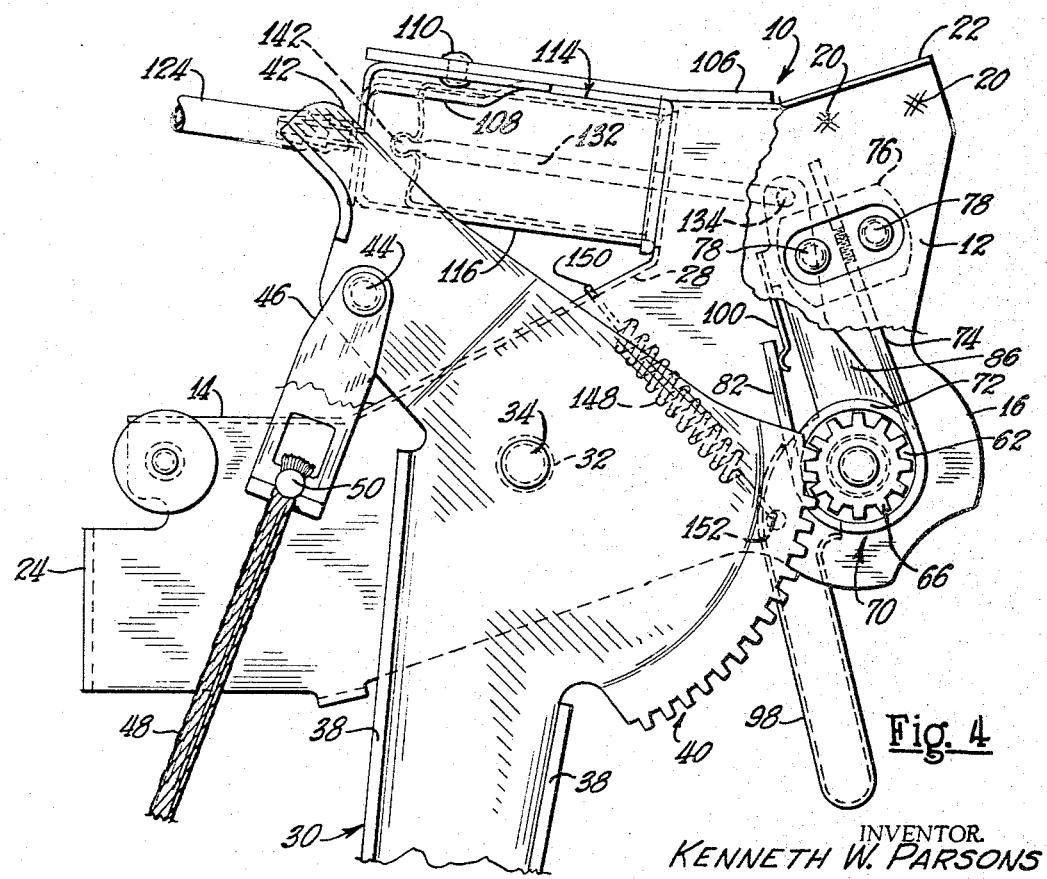
FIGURE 4 is an elevational view of the construction shown in FIGURE 1 illustrating the lever release mechanism in released position.

It should be noted in FIGURES 1 and 4 that the radius of the pitch line of the toothed rack or toothed sector portion 40 of the lever construction generated about the axis of the fulcrum pin 34 is several times greater than the radius of the pitch line of teeth of the pinion portion 66, providing a motion multiplying or force reducing means through the sector and pinion construction whereby substantial rotation of the pinion 66 occurs as compared to the angular distance through which the toothed rack portion 40 is moved by the lever or actuator 30 in setting the brakes, this construction proportionately reducing the locking or retaining force required of the coil portion 72 to retain or lock the drum 62 in brake setting positions.

The opposite end region of the retaining means 70 is fashioned as a second terminal portion 82 which is unsecured and is disposed for complete freedom of movement to enable the coils 73 of the spring portion 72 to normally frictionally grip the exterior surface of the drum 62. A release means is provided for actuating or moving the unsecured terminal portion 82 of the retaining means in a direction tending to unwind the coils of the spring portion 72 so as to release the frictional grip of the coil spring portion 72 on the drum 62.

As shown in FIGURE 2, a release arm or member 86, preferably formed of sheet metal, is fashioned with a laterally extending circular flange 88 defining an opening through which extends a tenon portion 90 of the shaft 56 whereby the member 86 is pivotally supported on the shaft portion 90. A washer 92 is received on a tenon portion 90 of the shaft 56, the end of the shaft being swaged as at 94 into engagement with the washer 92 whereby the release member 86 is maintained in assembled relation with the shaft 56 and is rotatable about the axis of the shaft.

An enlarged central portion 96 of the shaft 56 is disposed between the hub portion 64 of the drum and the flange 88 on member 86 to maintain these components in proper spaced relation. The member 86 is provided with a hand grip portion 98 for manual release of the brake retaining means. Release of the coil portion 72 from frictional gripping engagement with the drum 62 is effected by moving the free terminal portion 82 away from the anchored terminal portion 74.

The release member 86 is provided with a laterally extending pad portion 100 which is engageable with the free terminal portion upon movement of the release arm 86 in a counterclockwise movement, as viewed in FIGURES 1 and 4, about the axis of the supporting shaft 56.

It is found that a comparatively slight relative movement of the distal or free terminal portion 82 by the member 86 in a direction tending to unwind the coil spring portion 72 is sufficient to release or render ineffective the frictional grip of the convolutions 73 of the spring on the drum 62 whereby to permit the conventional brake springs (not shown) acting through the cable 48 to return the lever construction 30 to its initial brake release position as shown in FIGURE 1.

The construction of parking brake actuator and locking and release means therefor is inclusive of a servo-motor or power actuated means of the invention for controlling the release of the coil spring portion 72 from the drum 62 through the movement of the release member or arm 86. One form of servo-motor or power actuator of the invention is illustrated in combination with the brake actuator in FIGURES 1 through 4 and is illustrated in detail in FIGURES 5 through 8. Welded or otherwise secured to flange portions 26 and 28 of the support means is a plate or member 106, shown in FIGURES 1 and 4, the plate being omitted from FIGURES 2 and 3 for purposes of illustration.

Secured to the plate 106 is a bracket 108 fastened to the plate by means of rivets 110 which extend through openings 112 in the bracket 108 and through registering openings in the plate 106. The bracket 108 directly supports the servo-motor or power unit 114. As particularly shown in FIGURE 8, the power unit includes a cylindrically shaped cup-like member 116, preferably formed of sheet metal, and having an end wall 118.

The end wall 118 of member 116 is provided with an integral projecting hollow nipple portion 120 providing a tubular passage 122 adapted to accommodate the end of a flexible tube 124 adapted to be connected with a source of vacuum or reduced fluid pressure such as the intake manifold of the internal combustion engine of the vehicle with which the parking brake mechanism and power unit are associated. The axis of the tubular nipple portion 120 is on the longitudinal axis of the circular cylindrical portion 117 of member 116. The end region of the cup member 116 is preferably bent upon itself as at 156 to assure maintenance of the circular cross section.

Snugly fitted into but slidably disposed in the circular cylindrical portion 117 is a second cup-shaped member 126 having a circular cylindrical portion 128 and an end wall 130 integral therewith, the member 126 being preferably formed of sheet metal. The space between the end walls 118 and 130 provides a chamber 127 subjected to differential pressure.

A link or rod 132 is adapted to connect the relatively slidable member 126 with the release control arm or member 86 of the brake release arrangement hereinbefore described. One end of the rod 132 is provided with a transversely extending end region 134 received in an opening provided in the upper end region of the control arm 86 as shown in FIGURES 1, 2 and 4.

A clip 136 embraces the end of the arm 86 and the adjacent region of the rod 132 to prevent disengagement of the rod with the release arm. As particularly shown in FIGURE 8, the end wall 130 of the inner cup-like member 126 is fashioned with a hollow ball-like portion or configuration 140, and the adjacent end of the rod 132 fashioned with a ball portion 142, providing a connection between the member 126 and the rod 132.

In the method of assembly of these components, the hollow ball portion 140 is initially fashioned to receive the ball 142 on the rod 132, and the end wall subsequently swaged, distorted or "necked in" as shown at 144 into a region of reduced diameter 146 of the rod to establish a ball-type connection between the member 126 and the rod 132 providing for limited pivotal movement of the rod with respect to the member 126 during movement of the rod in actuating the release arm 86.

A resilient means is provided for normally returning the release member 86 to its normal position as shown in FIGURE 1. A coil spring 148, shown in FIGURES 1 and 4, has one end 150 hooked into a flange 28 of the support member 14, the other end 152 engaging in an opening in the arm or member 86. The spring 148 is of the contractile type and normally biases the member 86 to its normal position.

The cylindrical telescoping portions 117 and 128 of the members 114 and 126 are dimensioned so that a snug fit is provided with just sufficient clearance to permit slidable movement of one with respect to the other. It is found that for a construction wherein the exterior surface of the inner cup-like member is about an inch in diameter that one thousandth of an inch clearance space is satisfactory. Where the diameter of the cylindrical exterior surface of the inner cup is larger, the clearance space should be made proportionately larger.

One of the features of the invention resides in the provision of a mobile material or medium intermediate the contiguous cylindrical surfaces of portions 117 and 128 having the characteristics of high viscosity and cohesive properties so as to tenaciously adhere to the contiguous surfaces and thereby provide an effective seal between the surfaces without fracture or leakage whereby differential pressure impressed in the chamber 127 between the end walls 118 and 130 will effect relative movement of the member 126 with respect to the member 116.

Examples of mobile material having the desired characteristics to obtain the seal are fiber grease, silicone grease or molybdenum disulphide or compositions containing one or more of these constituents. The mobile material should be highly viscous and have a substantially constant viscosity within a temperature range of −40° F. to about 185° F. It is to be understood that other materials having the desired cohesive and viscosity characteristics which will adhere tenaciously to the contiguous surfaces of the cup-like members 114 and 126 may be employed for the purpose.

The clearance space between the contiguous surfaces of the cylindrical portions 117 and 128 is made as small as practicable to reduce to a minimum the area of the mobile material subjected to the differential pressure impressed in the chamber 127 between the end walls 118 and 130 so that the seal provided by the mobile material will not be fractured. A mobile material of a comparatively high viscosity such as fiber grease, molybdenum disulphide or silicone grease having high molecular cohesion and a tenacity to adhere to the contiguous metal surfaces has a seal strength which exceeds the forces tending to fracture the seal when the area subjected to pressure is comparatively minute.

The lengths of the contiguous cylindrical surfaces of members 116 and 126 should be sufficient so that when the cup member 126 is partially withdrawn from the cup member 116 to approximately the position shown in FIGURE 3, substantial areas of the contiguous surfaces remain in telescoping relation.

It is found that the amount of telescoping overlap of the contiguous surfaces when the inner cup member 126 is in its extended position as shown in FIGURES 1 and 3 should be approximately equal to the exterior diameter of the cylindrical portion 128 of the cup member 126 so that a sufficient amount of the mobile material remains between the telescoped contiguous surfaces to maintain an effective seal when differential or reduce pressure is established in the chamber 127 to prevent leakage of air or fluid along the contiguous cylindrical surfaces.

FIGURE 9 illustrates a modified form of servo-motor construction of the invention. In this form the interior cup member 126' having an end wall 130', the ball-shaped configuration 140' connected with the rod 132' are of the same construction as shown in FIGURE 8. The outer cup-shaped member 160 has an end wall 162 integrally formed with a nipple portion 164 providing a tubular passage 166, the nipple being adapted to be connected by a flexible tube with a source of reduced pressure.

The exterior surface of the cup portion 128' and the inner surface of the cylindrically-shaped wall 168 are fashioned with a minimum of clearance between them to permit slidable movement of one member with respect to the other. In this form of construction a mobile sealing material of the character hereinbefore mentioned is disposed between the contiguous cylindrical surfaces of the members 126' and 160.

The wall region at the open end of the cylindrically-shaped portion of member 160 is fashioned with an annular groove formed by distorting the metal adjacent the end of member 160 into a cross section of semicircular shape as indicated at 170, the configuration 170 encircling the cylindrical portion 128' of the inner cup-like member 126'. Disposed in the circular recess provided by the configuration 170 is a so-called O-ring 172 of circular cross section, the O-ring contacting the exterior cylindrical surface of the cup member 126'.

The O-ring 172 is of rubber-like material and may be employed as an assist in maintaining the mobile material between the contiguous surfaces of portions 128' and 168 of the members during sliding movement of one member with respect to the other. The O-ring 172 is formed by nonmetallic material which is resistant to deterioration by the mobile material. The portion 170 provides a circular ridge enhancing the maintenance of the circular cross section of the cylindrical portion 168 against distortion.

FIGURE 10 illustrates a modification wherein the O-ring is mounted on or carried by the relatively movable inner cup member. The outer cup member 116" is of the same construction as the cup 116 shown in FIGURE 8 and includes a cylindrically-shaped portion 117", end wall 118" and a nipple portion 120".

The inner or relatively movable cup member 176 is fashioned with a hollow cylindrical portion 178 having its exterior surface contiguous with the interior surface of the cylindrical portion 117″, the diameter of the exterior surface of the cylindrical portion 178 being of a dimension to provide for slidable movement relative to the contiguous surface of the cylindrical portion 117″.

The inner cup member 176 is provided with an end wall 130″ and a ball-shaped configuration 140″ which embraces a ball configuration 142″ provided on the end of the rod 132″. The wall region of the inner cup-like member 176 adjacent the end wall 130″ is fashioned with a peripheral recess provided by circumferentially impressing the metal of the wall inwardly forming an interior circular ridge 180. An O-ring 182 is disposed in the recess and engages the inner cylindrical surface of portion 116 of the outer cup member.

Mobile sealing material is disposed between the contiguous surfaces of the cylindrical portions 117″ and 178 and the O-ring 182 supplements the seal provided by the mobile material or medium to resist entrance of atmospheric air into the chamber between the end walls 130″ and 118″ when reduced pressure is existent in the chamber 127″.

FIGURE 11 is a view similar ot FIGURE 8 illustrating the position of the ball-shaped configuration on the inner cup member when the same is serving as a valve means to interrupt transmission of fluid pressure to the chamber 127 provided between the end wall 118 of the outer cup member 116 and the end wall 130 of the inner cup member 126.

As shown in FIGURE 11, the exterior spherical surface of the hollow ball-like configuration 140 formed at the central axial region of the end wall 130, providing the connection with the rod 132, engages the entrance region or throat of the passage 122 in the nipple member 120.

Thus, in certain instances of use of the servo-motor, it may be desirable to interrupt the transmission of reduced pressure into the chamber 127 between the end walls 118 and 130 and this may be accomplished by utilizing the hollow ball-shaped configuration 140 as a valve means for closing the passage 122. The ball configuration in the forms of servo-motor illustrated in FIGURES 9 and 10 may be utilized as a valve means.

Through the arrangement of the invention an effective fluid pressure actuated servo-motor is provided which functions without appreciable friction and eliminates the use of a diaphragm whereby the construction may be inexpensively manufactured of sheet metal by suitable dies and at high production rates. The arrangement is particularly usable as a servo-motor for controlling the release mechanism of a vehicle parking brake as illustrated herein where reduced pressure or vacuum is utilized for actuating the inner cup member and does not exceed about twelve pounds per square inch. By reason of the minute cross sectional area between the telescoping cylindrical surfaces of the cup members, the viscous mobile media is effective to resist fracture of the seal provided thereby under comparatively low fluid pressures.

While it is preferable to form the cup-like members from sheet metal, such as sheet steel, aluminum or the like, the members may be fashioned of molded plastic, if desired.

It is apparent that, within the scope of the invention, modifications and different arrangements may be made other than as herein disclosed, and the present disclosure is illustrative merely, the invention comprehending all variations thereof.

I claim:
1. An air pressure actuable servo-motor comprising, in combination, a first cylindrically-shaped thin-walled member having an end wall, a second cylindrically-shaped thin-walled member having an end wall and telescoped in said first member having their contiguous cylindrical surfaces in close slidable relation with the end walls in adjacent relation, a mobile viscous material disposed between the contiguous surfaces of said members and having cohesive characteristics whereby to form a pressure resistant seal between said members, said material being selected from a group comprising fiber grease, silicone grease and molybdenum disulphide, and passage means in a wall of one of the members for connection with a source of subatmospheric pressure for establishing differential pressure between said members.

2. In combination with a parking brake actuator for vehicle parking brakes having a lever mounted on a support adapted to be connected with the parking brakes and a means cooperating with the lever for retaining the lever in brake setting positions, release means for the lever retaining means including a release element, a pair of cup-shaped members of sheet metal having cylindrical wall portions in slidable telescoping relation, mobile viscous material contained between the cylindrical portions providing a pressure resistant seal, one of said members being anchored to the support, each of said members having one end wall with the open ends of the members in adjacent relation, one of said members having passage means for connection with a source of subatmospheric pressure for reducing the pressure in the region between the end walls to effect slidable movement of one member relative to the anchored member, and means connecting the slidable member with the release element for controlling said release means.

3. In combination with a parking brake actuator for vehicle parking brakes having a lever fulcrumed on a support and adapted to be connected with the parking brakes and a means mounted by the support cooperating with the lever for retaining the lever in brake setting positions, release for said lever retaining means including a release element, a pair of cup-shaped members of sheet metal having cylindrical portions in slidable telescoping relation, a material between the cylindrical portions providing a pressure resistant seal, the sealing material being selected from the group comprising fiber grease, silicone grease and molybdenum disulphide, each of said members having an end wall, one of said members being anchored to the support and having passage means in a wall thereof for connection with a source of subatmospheric pressure for reducing the pressure in the region between the end walls to effect slidable movement of the other of said members, and means connecting the slidable member with the release element for controlling said release means.

References Cited
UNITED STATES PATENTS

| | | | |
|---|---|---|---|
| 302,880 | 7/1884 | Baumgarten | 92—168 |
| 912,321 | 2/1909 | Palm | 277—135 X |
| 957,347 | 5/1910 | Kennedy | 92—99 X |
| 2,087,937 | 7/1937 | Kuwada | 92—83 X |
| 2,615,379 | 10/1952 | De Groff | 92—165 X |
| 2,780,204 | 2/1957 | Barley | 91—394 |
| 2,781,117 | 2/1957 | McLeod | 74—531 X |
| 2,927,829 | 3/1960 | Porter et al. | 277—135 |
| 2,942,582 | 6/1960 | Dempster et al. | 92—168 |
| 3,015,315 | 1/1962 | Strimel | 92—165 X |
| 3,151,617 | 10/1964 | Baum | 92—169 X |
| 3,236,121 | 2/1966 | Gdowik et al. | 74—531 |

MARTIN P. SCHWADRON, *Primary Examiner.*

I. C. COHEN, *Assistant Examiner.*